Figure 1:
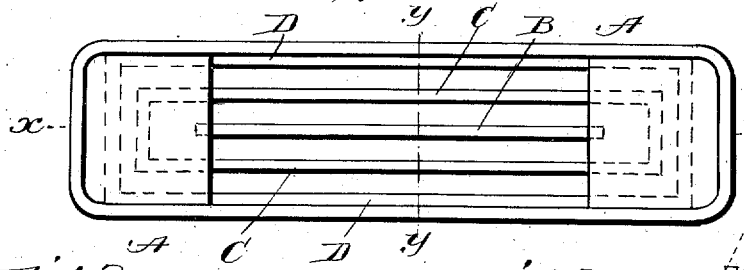

No. 12,019. Reissued Aug. 12, 1902.

H. S. AMWAKE.

ELECTROCHEMICAL GENERATOR.

(Application filed July 16, 1902.)

Witnesses:
J. M. Fowler Jr.
F. T. Chapman.

Inventor
Harry S. Amwake
By Lyons & Bissing.
Attys

UNITED STATES PATENT OFFICE.

HARRY S. AMWAKE, OF CAMDEN, NEW JERSEY, ASSIGNOR TO CHARLES H. GRAHAM AND GEORGE D. BOUTON, OF PHILADELPHIA, PENNSYLVANIA.

ELECTROCHEMICAL GENERATOR.

SPECIFICATION forming part of Reissued Letters Patent No. 12,019, dated August 12, 1902.

Original No. 702,760, dated June 17, 1902. Application for reissue filed July 16, 1902. Serial No. 115,884.

*To all whom it may concern:*

Be it known that I, HARRY S. AMWAKE, a citizen of the United States, residing in the city and county of Camden, State of New Jersey, have invented new and useful Improvements in Electrochemical Generators, of which the following is a specification.

My invention relates to electrochemical single fluid generators or battery-cells, the object being to secure a cell in which the chemical action shall not markedly exceed the rate at which the electric current is drawn from the cell, whereby I obtain a battery-cell of high efficiency—that is to say, a cell in which the chemical energy is as completely as may be converted into electrical energy.

A further object of my invention is to secure a cell giving a high and constant electromotive force.

To this end my invention consists of a single fluid battery-cell provided with a current-conducting baffle or partition placed between the positive and the negative electrode or electrodes. This baffle is placed in such position between the electrodes that the movement of the electrolyte, due to differences of temperatures between different parts of the same, will take place in a devious or circuitous path, whereas the electric current may pass directly through the conducting-baffle from one electrode to the other.

The material of the baffle, screen, or partition must be an electric conductor; but it is not necessary, although it is preferable, that it be a good conductor. The only condition which must be observed in this respect is that the baffle be made of a material that is a better conductor than the electrolyte employed. Consequently the baffle may be made either metallic or semimetallic or non-metallic, or it may consist of a compound of non-conducting and conducting substances. In structure the material of the baffle may be porous or dense. When the porosity is great, I may make the conductance slight, and when the porosity of the baffle material is slight I may make the conductance great; but these factors would be varied in accordance with the desired output of the generator and with the length of life to be given to the electrolyte which is employed. A good material for the baffle which can be well adapted to these various requirements is carbon, which can be manufactured of all degrees of porosity and conductance.

By placing a current-conducting baffle, screen, or partition between the positive and negative electrodes the internal resistance of the cell is diminished, because the conductivity of the baffle is greater than the conductivity of the section of the electrolyte which it displaces. Moreover, by the employment of the baffle I can place the two electrodes or sets of electrodes much nearer together than in ordinary batteries without the inconveniences ordinarily arising from such close proximity. Each electrode may be placed quite close to the baffle, one on one side and one on the other, so long as sufficient space is left between each electrode and the baffle to allow of the proper circulation of the electrolyte which is required to maintain a steady discharge of current from the cell. In this manner an additional reduction of the internal resistance of the cell is secured.

I preferably construct the baffle, screen, or modifier with rough faces, since I have found that this will promote the constancy of the electromotive force of each generator unit.

In the preferred form of my improved battery-cell the baffle is constructed to entirely surround one of the electrodes or one set of electrodes of the same sign, whereby the material of the baffle becomes interposed between the two electrodes on all sides. This will more fully appear from the following detailed description, with reference to the accompanying drawings, in which—

Figure 3:
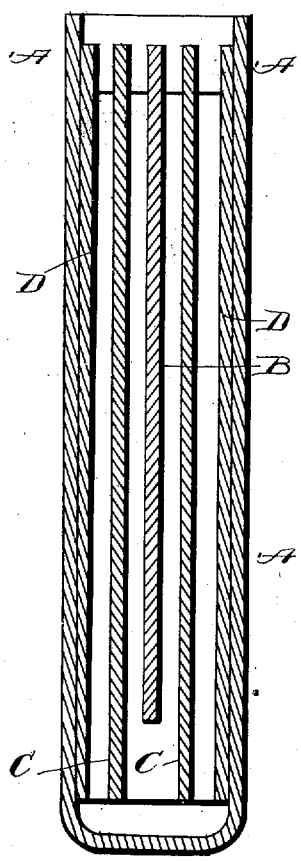
Figure 2:
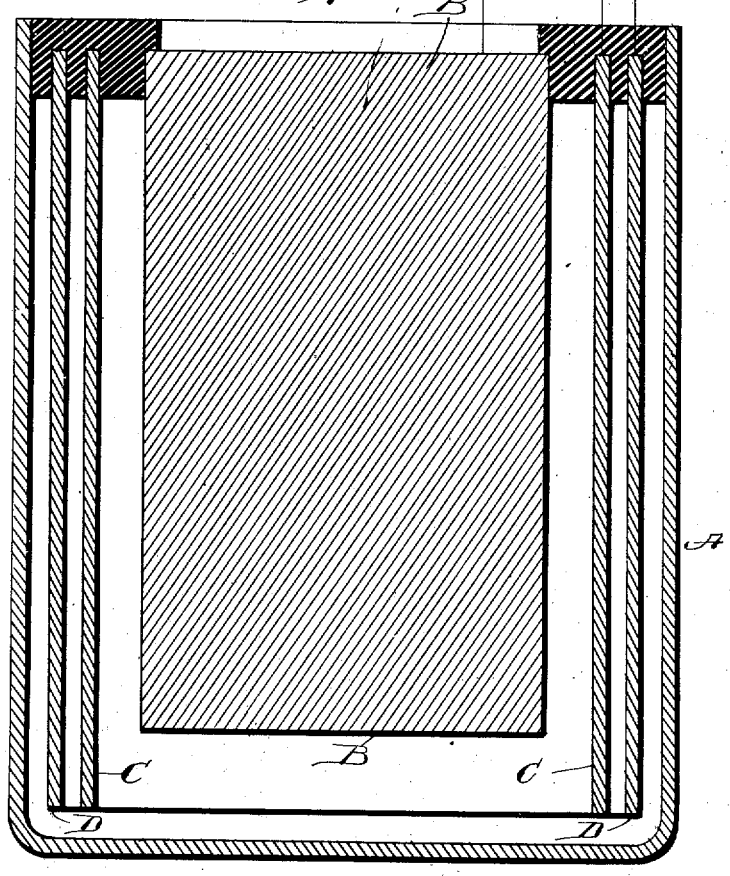

Figure 1 represents a top or plan view of an electrochemical generator embodying my invention; Fig. 2, represents a longitudinal vertical section thereof on the line $x\,x$, and Fig. 3 represents a transverse vertical section of the same on the line $y\,y$.

Similar letters of reference indicate corresponding parts in the figures.

In the drawings, A designates a case of insulating material, which is here shown rectangular. It constitutes the jar of the battery-cell and receives the electrolyte, the electrodes, and the baffle. One of the electrodes B is here shown as a single rectangular plate, and the other electrode D is shown as a rectangular sleeve or tube surrounding the electrode B. Between the two electrodes is located the baffle C, which is shown in the form of a rectangular sleeve or tube. Its structure, which is mainly or entirely of conducting material, completely surrounds the electrode B. The two electrodes and the baffle may be supported in the jar in any suitable manner, but are here shown as secured to an insulating-frame fitted into the top of the jar, as is conventionally indicated by dark shading. It is to be noted that the baffle does not extend to the bottom of the jar, but is raised from the same to allow of the revitalization of the electrolyte between the baffle and the electrode B, as will hereinafter more fully appear.

It will be seen that owing to the presence of the baffle between the two electrodes the electrolyte, which circulates in the jar, will be compelled to seek devious ways to pass from one electrode to the other. It will not pass directly from one electrode to the other.

As indicated in the drawings, the distance of each side face of electrode B from the opposed inner faces of the baffle is considerably less than the distance of each edge of electrode B from the opposed inner end faces of the baffle, and this construction is adopted in order that a thicker body of electrolyte be interposed between each edge of the electrode B and the end faces of the surrounding baffle than is interposed between each side face of the electrode B and the corresponding side faces of the baffle. The plate B is in the construction shown the positive electrode, which is chemically attacked by the electrolyte, and consequently the heat due to the chemical action which takes place in this battery-cell is generated mainly at the surface of this plate. Now with the construction shown—that is to say, with the spaces between the side faces of electrode B and the inner side faces of the baffle made narrower than the spaces between the edge faces of this electrode and the inner end faces of the baffle—the electrolyte within the narrower spaces will be raised to a higher temperature than the electrolyte within the wider spaces. This it seems causes a circulation of the electrolyte from the side faces of the positive electrode B toward each end face and downwardly between the end faces and the opposing faces of the baffle and a counter flux from the faces of the electrode D downwardly until the edges of the baffle and electrode D are cleared and then upwardly along and toward the faces of electrode B. By this circuitous flow of the electrolyte fresh portions of the same are slowly and gradually brought into contact with the positive electrode and only in the measure as current is drawn from the cell. I ascribe the constancy of electromotive force of my cell to this slow and gradual exchange of electrolyte, and I have found that when a direct path for the electrolyte between the electrodes is opened—as, for instance, by making a slot in one or more sides of the baffle—the beneficial results of the baffle are in a great measure lost, the constancy of electromotive force and the efficiency of the generator are both largely impaired, the life of the electrolyte is shortened, and the severity of local action is increased.

Although the baffle C is used to prevent a too-rapid circulation of the electrolyte about the electrode or electrodes most to be acted upon, I shall when demands for an extraordinary amount of current for short periods occur make use of said baffle to perform the additional function of a part of one electrode by any electromechanical means, one of which is shown in Fig. 2; but in normal operation of the cell the baffle must be metallically disconnected.

Various changes may be made in the details of construction without departing from the general spirit of my invention, and I do not, therefore, desire to be limited in each case to the same.

Having thus described my invention, what I claim as new, and desire to secure by Letters Patent, is—

1. An electrochemical generator consisting of a single fluid-cell, provided with a positive electrode and a negative fixed electrode, an electrolyte, and a current-conducting baffle-partition in said electrolyte, between said electrodes and normally insulated therefrom.

2. An electrochemical generator, consisting of a positive electrode, a negative fixed electrode, an electrolyte, an electric-current-conducting baffle-partition normally insulated from said electrodes and means for making said baffle-partition part of either of said electrodes to act therewith.

3. An electrochemical generator consisting of a single fluid-cell having positive and negative electrodes and a current-conveyer of high conducting or current-carrying capacity interposed as a modifier, screen or baffle between the positive and negative electrodes and adapted to control the rate of change of position of the electrolyte attacking the electrodes most to be acted upon without interfering with the current-flow between the electrodes in the case.

4. An electrochemical generator consisting of a single fluid-cell provided with a positive electrode and a negative fixed electrode, an electrolyte and a current-conducting baffle-partition in said electrolyte between said electrodes and normally insulated therefrom, providing means for causing a higher temperature of the electrolyte between the largest areas of the baffle-partition and the positive electrode and lower temperature between the smallest areas opposed.

5. An electrochemical generator consisting of a single fluid-cell, a positive electrode, a negative electrode, an electrolyte, and a current-conducting baffle, normally insulated from the electrodes, which baffle is in the electrolyte and surrounds one of the electrodes.

6. An electrochemical generator consisting of a single fluid-cell, a positive electrode, a negative electrode, an electrolyte, and a current-conducting baffle, in the electrolyte, which baffle surrounds one of the electrodes, is open at the bottom, and is normally insulated from the electrodes, substantially as described.

In testimony whereof I have signed my name to this specification in the presence of two subscribing witnesses.

HARRY S. AMWAKE.

Witnesses:
JOHN A. WIEDERSHEIM,
WATSON B. RULON.